United States Patent [19]
Gary et al.

[11] Patent Number: 6,047,561
[45] Date of Patent: Apr. 11, 2000

[54] PROCESS AND DEVICE FOR THE PRODUCTION OF ULTRA-PURE INERT GAS

[75] Inventors: Daniel Gary, Montigny-le-Bretonneux; Réné Lardeau, Saulx-les-Chartreux; Jean-Yves Thonnelier, Voisins-le-Bretonneux, all of France

[73] Assignee: L'Air Liquide, Societe Anonyme pour l'Etude et l'Exploitation des Procedes Georges Claude, Paris, France

[21] Appl. No.: 09/122,639

[22] Filed: Jul. 27, 1998

[30] Foreign Application Priority Data

Jul. 31, 1997 [FR] France ................................. 97 09807

[51] Int. Cl.[7] ........................................................ F25J 1/00
[52] U.S. Cl. ................................................ 62/624; 62/931
[58] Field of Search ........................................ 62/624, 931

[56] References Cited

U.S. PATENT DOCUMENTS 3,250,080 5/1966 Garwin ...................................... 62/624
4,529,411 7/1985 Goddin, Jr. et al. ..................... 62/624

*Primary Examiner*—Ronald Capossela
*Attorney, Agent, or Firm*—Young & Thompson

[57] ABSTRACT

A device and a process for preparing a high-purity inert gas from air, includes the successive steps of:
  a) cryogenically distilling compressed air,
  b) recovering an impure inert fluid containing hydrogen impurities ($H_2$) and residual impurities,
  c) adsorbing at least some of the residual impurities contained in the impure inert fluid by at least one bed of at least one adsorbent,
  d) recovering an intermediate inert fluid containing hydrogen impurities,
  e) removing the hydrogen impurities contained in the intermediate inert fluid by permeation, and
  f) recovering a high-purity inert fluid in the gas state.

18 Claims, 2 Drawing Sheets

PROCESS AND DEVICE FOR THE PRODUCTION OF ULTRA-PURE INERT GAS

BACKGROUND OF THE INVENTION

The present invention relates to the field of producing high-purity inert gases from air.

DESCRIPTION OF THE RELATED ART

High-purity inert gases find applications in many sectors of industry, and in particular in the electronics sector, either in the liquid or gas state.

Customarily, high-purity inert fluids, such as nitrogen or argon, are produced by cryogenically distilling ambient air so as to produce a variable-purity inert fluid, and subsequently purifying the said inert fluid in order to remove the residual impurities from it, for example hydrogen ($H_2$), carbon monoxide (CO) and traces of oxygen ($O_2$), and thus to obtain a high-purity inert fluid, that is to say one which contains less than a few ppb (parts per billion by volume) of impurities.

Customarily, the subsequent purification of the inert fluid produced by cryogenic distillation is carried out by adsorbing the residual impurities on a plurality of types of adsorbent materials, for example getters. zeolites and porous metal oxides.

Furthermore, it is also known to subject the air to be distilled to a pretreatment, before making it undergo the cryogenic distillation mentioned above.

In general, the air is pretreated by catalytically oxidizing some of the oxidizable impurities contained in air, for example carbon monoxide (CO) and hydrogen ($H_2$), so as to convert these oxidizable species into carbon dioxide ($CO_2$) and water ($H_2O$); the carbon dioxide and the water are removed in order to prevent them from causing clogging within the cryogenic distillation columns.

The oxidation catalysts used for this purpose generally consist of a metal, for example platinum or palladium, deposited on a support, such as alumina.

However, this pretreatment of the air presents many limitations.

Firstly, it is known that oxidation catalysts are greatly exposed to risks of poisoning, leading to their progressive deactivation in the course of time due to the various pollutants contained in the air to be treated, for example in particular compounds containing halogens or sulphur, and the oily vapours generated by the compression of air.

Next, it is necessary to combine high-performance cryogenic distillation with this pretreatment in order to produce an oxygen-free inert fluid, and this is done by increasing the height of the cryogenic distillation column or columns, and therefore entails a significant increase in investment and therefore the overall cost of the inert fluid produced in this way.

Furthermore, the post-treatment of the inert fluid produced by cryogenic distillation is not ideal either, since it requires the use of purification devices or purifiers which are often expensive and sometimes is unsuitable for efficient purification with respect to certain impurities, for example in particular hydrogen, which is difficult to remove because it represents a relatively short penetration time, and therefore require frequent regenerations of the adsorbent bed at high temperatures (of the order of 200° C.).

Several documents in the prior art describe processes of this type for pretreating and/or post-treating air and/or post-treating the inert fluid which is produced, for example in particular the documents EP-A-0240270, EP-A-0197717, EP-A-0438282 or EP-A-0606081.

SUMMARY OF THE INVENTION

The object of the present invention is therefore to provide a process and a device which make it possible to produce a high-purity inert fluid, for example nitrogen or argon, and can be used for the purposes of electronics, which process and device do not have the drawbacks of the prior art devices, permit effective removal, in particular of impurities such as hydrogen, have reasonable costs and are easy to employ on an industrial scale.

The present invention therefore relates to a process for preparing a high-purity inert gas from air, comprising the successive steps of:

a) cryogenically distilling compressed air, b) recovering an impure inert fluid containing hydrogen impurities ($H_2$) and residual impurities, c) adsorbing at least some of the residual impurities contained in the said impure inert fluid by means of at least one bed of at least one adsorbent, d) recovering an intermediate inert fluid containing hydrogen impurities, e) removing the hydrogen impurities contained in the said intermediate inert fluid by permeation, f) recovering a high-purity inert fluid in the gas state.

Depending on the particular situation, the process of the invention may comprise one or more of the following characteristics:

it furthermore includes the recovery of a permeation gas mixture containing the said inert gas and hydrogen;

the permeation gas mixture contains less than 10% of hydrogen, and in general less than 1% of hydrogen, which corresponds to substantially all of the hydrogen originally contained in the intermediate inert fluid, the remainder being essentially the said inert gas;

the permeation gas mixture is stored;

it furthermore includes regeneration of at least one bed of adsorbent by means of the permeation gas mixture;

prior to the said regeneration, a hydrogen complement is added, where appropriate, to the permeation gas mixture so as to obtain a regeneration mixture containing from 1 to 5% of hydrogen, the remainder being essentially the said inert gas;

it includes, prior to step e), at least one step of heating and/or vaporizing the inert fluid containing hydrogen impurities;

it includes, prior to step a), at least one step of drying and/or decarbonating the air;

the adsorbent material is selected from exchanged or unexchanged natural or synthetic zeolites or porous metal oxides;

the inert gas is chosen from argon and nitrogen.

The invention also relates to a device for preparing a high-purity inert gas from ambient air, comprising:

means for compressing ambient air, means for cryogenically distilling the compressed air, including at least one cryogenic distillation column, means for recovering at least one impure inert fluid containing hydrogen impurities ($H_2$) and residual impurities, means for adsorbing at least some of the said residual impurities, comprising at least one adsorber, means for recovering an intermediate inert fluid containing hydrogen impurities, permeation means comprising at least one module for permeating the said intermediate inert fluid containing hydrogen impurities, and means for recovering a high-purity inert gas.

Depending on the particular case, the device of the invention may comprise one or more of the following characteristics:

the permeation means comprise a plurality of membrane modules inserted into a chamber whose temperature may be regulated;

the permeate outlet of the permeation means is connected to at least one machine selected from vacuum pumps and compressors. It is thus possible to subject the permeate side of the membrane modules to a partial vacuum;

the adsorption means comprise at least two adsorbers operating in parallel;

it furthermore includes means for recovering a permeation gas mixture containing, or formed by, the permeated fraction of the said inert gas and substantially all of the hydrogen contained initially in the intermediate inert fluid. The hydrogen concentration in the permeation gas mixture is less than 10%, and in general less than or equal to about 1%.

The invention furthermore relates to a regeneration gas mixture including from 1 to 5% of hydrogen and an inert gas, the said gas mixture being capable of being obtained by the process mentioned above.

DESCRIPTION OF THE PREFERRED EMBODIMENTS

The invention will now be described in more detail with the aid of two embodiments which are given by way of illustration but without implying any limitation, and with reference to the appended FIGS. 1 and 2.

Figure 1:
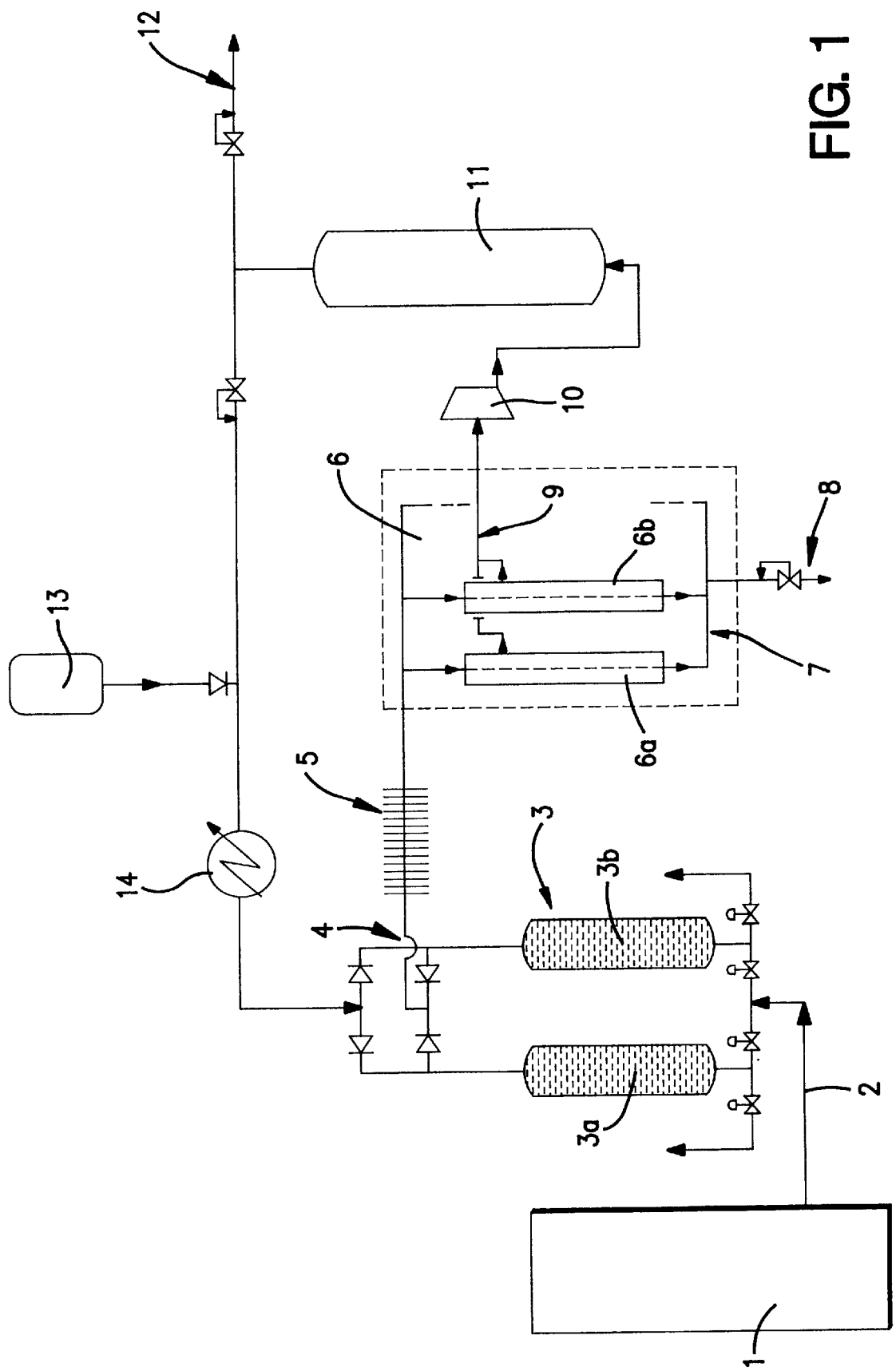
FIGS. 1 and 2 each illustrate an embodiment of the invention.

FIG. 1 represents a first embodiment of a device for producing an ultra-pure inert fluid from ambient air, the inert fluid being nitrogen in this case.

Ambient air is compressed by compression means (not shown) and then sent to a pretreatment zone (not shown) in which the air is dried and decarbonated in order to remove the contaminants such as $CO_2$ and $H_2O$ therefrom.

The dried and decarbonated compressed air is then sent to an air separation unit 1 comprising one or more heat exchangers and one or more cryogenic distillation columns, in which unit it is fractionated.

At the outlet of the air separation unit, an impure inert fluid is recovered, here nitrogen, in the liquid or gas state.

The impure cryogenic nitrogen produced in this way contains from a few ppm (parts per million by volume) to a few tens of ppm of impurities.

It should be emphasized that the ability to make do with producing impure nitrogen is very advan-tageous economically, given that this makes it possible to reduce considerably the height of packing inside the cryogenic distillation column or columns in comparison, for example, with the production of nitrogen having higher purity.

The impure nitrogen produced in this way generally contains residual impurities such as oxygen ($O_2$) and carbon monoxide (CO), and hydrogen impurities ($H_2$), which were initially present in the ambient air.

The impure nitrogen produced in this way will then be subjected to a post-treatment by adsorption in a purification zone 3 including two adsorbers 3a and 3b operating in parallel, that is to say when the adsorber 3a is in the purification phase, the adsorber 3b is in the regeneration phase, and vice versa.

Each of these adsorbers 3a and 3b contains one or more beds of an adsorbent making it possible to remove the residual impurities contained in the impure nitrogen, in particular carbon monoxide (CO) and oxygen ($O_2$), so that intermediate-purity nitrogen or "intermediate" nitrogen can be recovered at the outlet of the said purification zone 3, that is to say nitrogen which essentially contains hydrogen impurities ($H_2$).

The removal of the impurities CO and $O_2$ may be carried out in the liquid and/or gas state, for example, by means of an adsorbent such as a porous metal oxide, for example an activated hopcalite, or any other suitable adsorbent.

The intermediate nitrogen containing hydrogen impurities is recovered at the outlet of the purification zone 3 by recovery means 4, and is optionally heated and/or vaporized in one or more heat exchangers 5 before being introduced into a permeation zone 6 including at least one, and preferably a plurality of, permeation modules 6a and 6b, for example membrane modules inserted into a chamber whose temperature is regulated, for example kept at a temperature of from 5° C. to 60° C., preferably of the order of 40° C.

At the retentate outlet, the recovery means 7 convey a flow of high-purity nitrogen, that is to say containing less than 1 ppb of impurities, to a site 8 where it is used or stored.

At the permeate outlet 9, furthermore, a permeation flow is recovered consisting of a mixture of nitrogen and hydrogen, and containing in general less than 1% of hydrogen, the remainder being essentially nitrogen.

This permeation flow, containing nitrogen and hydrogen, is subsequently compressed by a machine 10 and stored in one or more buffer containers 11 with a view to subsequent use.

In particular, this permeation flow may be used to regenerate, that is to say reactivate, the adsorbent beds contained in the adsorbers 3a and 3b.

In this case, the regeneration of the adsorbent preferably takes place in the hot state, that is to say at a temperature of the order of from 200 to 250°, in the presence of a reducing compound (hydrogen) at a level of from 1 to 5%.

However, it is in certain cases necessary to add a hydrogen complement to the permeation flow, so as to obtain a regeneration flow having a hydrogen level in the aforementioned range; a make-up hydrogen feed 13 is provided for this purpose.

Prior to its introduction to the absorber 3a or 3b, the regeneration flow is heated to the regeneration temperature by passing through a heater 14.

The permeation flow stored in the container 11 may also, if appropriate, be sent to a user site 12 where it will be used as it is, that is to say as service nitrogen which does not require high purity, for example as a purge, flushing, inerting or drying gas.

The permeation is preferably carried out at a temperature of the order of 40° C. and at a pressure of from 5 to 10 bar at the inlet of the modules.

The pressure of the permeate may, depending on the particular situation, be atmospheric pressure or a partial vacuum (0.2 bar absolute, for example); in this case, the machine 10 is then a vacuum pump or a vacuum pump feeding a compressor placed downstream.

Figure 2:
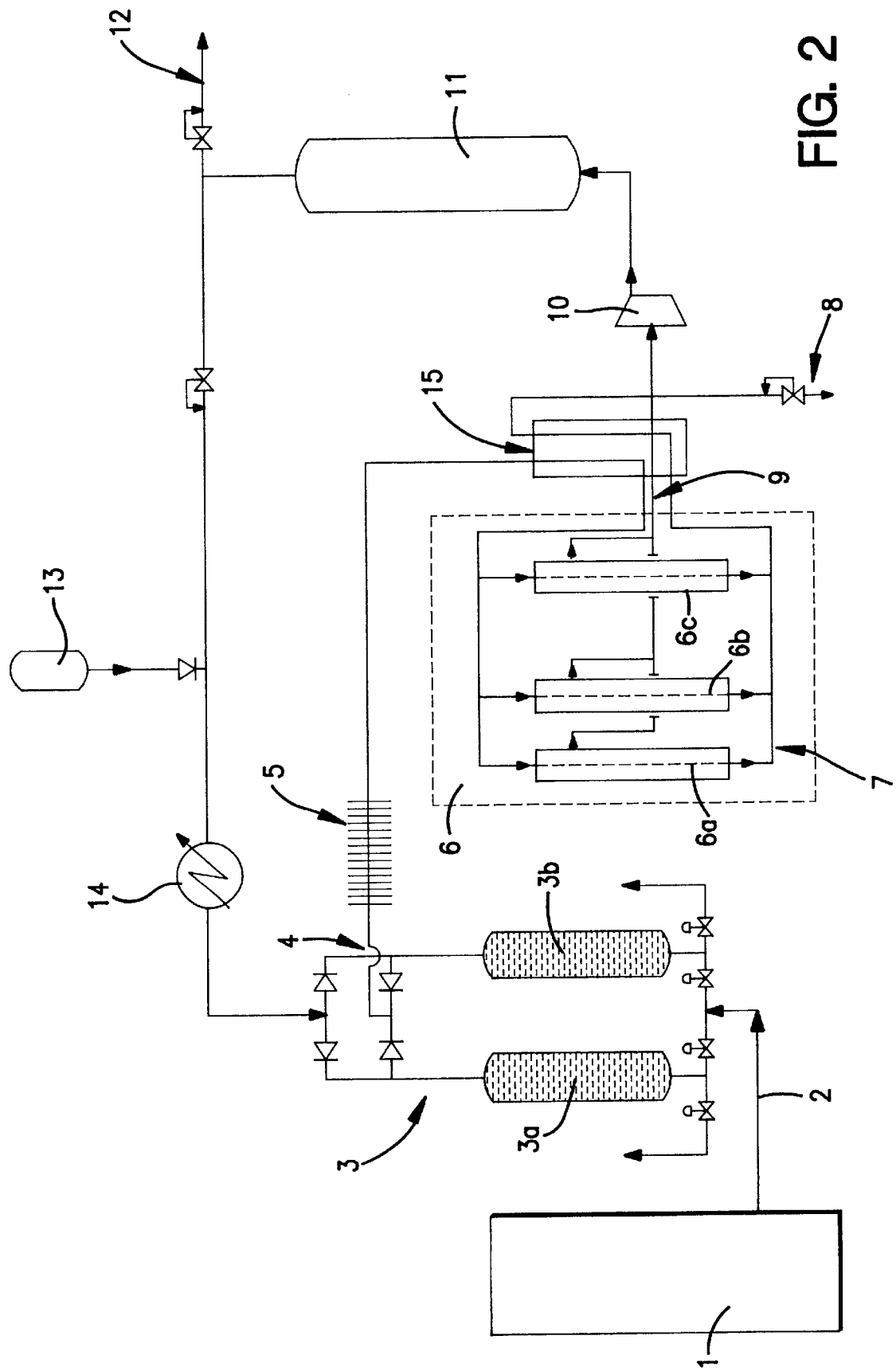

FIG. 2 is similar to FIG. 1, and the common parts have the same references.

However, the permeation zone 6 represented in FIG. 2 includes, in this case, not 2 but 3 permeation modules arranged in parallel, which makes it possible to increase the production rate.

Furthermore, FIG. 2 differs from FIG. 1 by the presence of a heat exchanger 15 which makes it possible to carry out thermal transfer between the intermediate-purity gag flow before it enters the permeation zone 6, the high-purity nitrogen flow recovered on the retentate side, and the permeation flow (nitrogen/hydrogen mixture) leaving the said permeation zone 6.

This particular arrangement has the advantage of making it possible to minimize the energy consumption of the temperature regulation system.

Although FIGS. 1 and 2 represent the device for producing high-purity nitrogen, these devices can also be used for the production of other high-purity inert gases, for example, in particular, argon.

Implementation of the process of the invention made it possible to obtain the results collated in the following table.

TABLE

| Test No. | 1 | 2 | 3 | 4 |
|---|---|---|---|---|
| Pressure at inlet of permeation zone (bar absolute) | 7.38 | 7.35 | 7.36 | 8.25 |
| Flow rate at inlet of permeation zone ($m^3$ (stp) . $h^{-1}$) | 5.02 | 6.00 | 6.00 | 5.02 |
| Permeate flow rate $m^3$ (stp) ($N_2/H_2$) . $h^{-1}$ | 2.09 | 1.57 | 1.24 | 1.51 |
| Retentate flow rate $m^3$ (stp) ($N_2$) . $h^{-1}$ | 2.93 | 4.43 | 4.76 | 3.51 |
| H2 level at inlet of permeation zone (ppb) | 900 | 900 | 200 | 4000 |
| H2 level at retentate-side outlet (ppb) | N.D. | N.D. | N.D. | N.D. |
| Permeation temperature (° C.) | 50 | 24 | 25 | 40 |
| Permeation pressure (bar abs.) | 0.65 | 0.80 | 0.40 | A.P. |

N.D.=not detected by the analyser marketed by the company TRACE ANALYTICAL under the reference RGA3.

A.P.=atmospheric pressure.

The above table demonstrates that the process of the invention makes it possible to produce ultra-pure nitrogen (less than 5 ppb of $H_2$) from impure nitrogen containing up to 4000 ppb of $H_2$ impurities, and for a variety of flow-rate, pressure and temperature conditions.

By virtue of a well-judged combination of three different separation techniques, namely cryogenic distillation, purification by adsorption and separation by permeation, the process and device of the invention make it possible to produce, on the one hand, inert fluids of very high purity that can be used in particular in the field of electronics, and, on the other hand, to utilize some of the waste gases or permeation gases which are customarily discharged to the atmosphere, by recovering them and using them for various purposes, in particular to regenerate the adsorbents used during the phase of purification by adsorption.

We claim:

1. Process for preparing a high-purity inert gas from air, comprising the successive steps of:
    a) cryogenically distilling compressed air,
    b) recovering an impure inert fluid containing hydrogen impurities ($H_2$) and residual impurities,
    c) adsorbing at least some of the residual impurities contained in the said impure inert fluid by means of at least one bed of at least one adsorbent,
    d) recovering an intermediate inert fluid containing hydrogen impurities,
    e) removing the hydrogen impurities contained in the said intermediate inert fluid by permeation,
    f) recovering a high-purity inert fluid in the gas state.

2. Process according to claim 1, further comprising the step of the recovery of a permeation gas mixture containing the said inert gas and hydrogen.

3. Process according to claim 2, wherein the permeation gas mixture contains less than 10% of hydrogen, the remainder being essentially the said inert gas.

4. Processing according to claim 3, wherein the permeation gas mixture contains less than 1% of hydrogen.

5. Process according to claim 2 wherein the permeation gas mixture is stored.

6. Process according to claim 1, further comprising the step of regeneration of at least one bed of adsorbent by means of the permeation gas mixture.

7. Process according to claim 6, wherein, prior to the said regeneration, a hydrogen complement is added to the permeation gas mixture so as to obtain a regeneration mixture containing from 1 to 5% of hydrogen, the remainder being essentially the said inert gas.

8. Process according to claim 1, further comprising, prior to step e), at least one step of heating and/or vaporizing the inert fluid containing hydrogen impurities.

9. Process according to claim 1, further comprising, prior to step a), at least one step of drying and/or decarbonating the air.

10. Process according to claim 1, wherein the adsorbent material is selected from exchanged or unexchanged natural or synthetic zeolites or porous metal oxides.

11. Process according to claim 1, wherein the inert gas is argon or nitrogen.

12. Regeneration gas mixture, comprising from 1 to 5% of hydrogen and an inert gas, which can be obtained by the process according to claim 1.

13. Device for preparing a high-purity inert gas from ambient air, comprising:
    means for compressing ambient air,
    means (1) for cryogenically distilling the compressed air, including at least one cryogenic distillation column,
    means (1, 2) for recovering at least one impure inert fluid containing hydrogen impurities ($H_2$) and residual impurities,
    means (3, 3a, 3b) for adsorbing at least some of the said residual impurities, comprising at least one adsorber (3a, 3b),
    means (4) for recovering an intermediate inert fluid containing hydrogen impurities,
    permeation means (6, 6a, 6b, 6c) comprising at least one module for permeating the said intermediate inert fluid containing hydrogen impurities,
    and means (7) for recovering a high-purity inert gas.

14. Device according to claim 13, wherein the permeation means (6, 6a, 6b, 6c) comprise a plurality of membrane modules (6a, 6b, 6c) inserted into a chamber (6) whose temperature is regulated by a temperature regulation system.

15. Device according to claim 13, wherein the adsorption means (3, 3a, 3b) comprise at least two adsorbers (3a, 3b) operating in parallel.

16. Device according to claim 13, further comprising means (9, 11) for recovering a permeation gas mixture containing the said inert gas and less than 10% of hydrogen.

17. Device according to claim 13, wherein the permeate outlet of the permeation means (6, 6a, 6b, 6c) is connected to at least one vacuum pump.

18. Device according to claim 13, wherein the permeate outlet of the permeation means is connected to at least one compressor.

* * * * *